March 14, 1967 K. M. GERTEIS 3,308,877
COMBINATION CONDITIONING AND WATER HEATING APPARATUS
Filed July 1, 1965 2 Sheets-Sheet 1

INVENTOR.
KARL M. GERTEIS.
BY
Frederick E. McMullen
ATTORNEY.

United States Patent Office 3,308,877
Patented Mar. 14, 1967

3,308,877
COMBINATION CONDITIONING AND WATER
HEATING APPARATUS
Karl M. Gerteis, Cazenovia, N.Y., assignor to Carrier
Corporation, Syracuse, N.Y., a corporation of Delaware
Filed July 1, 1965, Ser. No. 468,715
10 Claims. (Cl. 165—29)

This invention relates to a refrigeration apparatus and, more particularly, to a refrigeration apparatus adapted to heat water.

The inherent advantages of low cost, minimum complexity, and compactness of an integrated unit, particularly for use in homes, which may, during the warmer month, cool and dehumidify the home, and during the colder months, heat the home, and additionally satisfy at least a portion of the hot water demands of the home has long attracted interest. While integrated units designed to accomplish the above objects have been proposed, none has met with any degree of appreciable success.

It is a principal object of the present invention to provide a new and improved apparatus for conditioning an enclosure and heating water.

It is an object of the present invention to provide an air conditioning apparatus which salvages heat rejected by the air conditioning system for the purpose of heating service water.

It is an object of the present invention to provide an apparatus for conditioning an area effective during cooling operation to utilize the heat removed from the area being conditioned to heat water, and effective during heating cycle operation to employ the water as a source of heat for the area being conditioned.

It is a further object of the present invention to provide an integrated apparatus for cooling and heating a building which is capable of providing hot water for use in the building.

This invention relates to a conditioning apparatus comprising, in combination, a compressor having suction and discharge sides, expansion means, a first heat exchanger connecting the compressor discharge side with the expansion means, and a second heat exchanger in heat exchange relation with a first fluid medium connecting the expansion means with the compressor suction side to form a closed refrigeration system, the first fluid medium being usable to condition the area; a third heat exchanger disposed in heat exchange relation with a second fluid medium to be conditioned connected between the first exchanger and the compressor discharge side whereby upon operation of the compressor, the system cools the first medium while heating the second medium; supplemental heating means for the second fluid medium; and control means responsive to temperature conditions of the second fluid medium effective at a predetermined second fluid medium temperature to actuate the supplemental heating means.

Other objects and advantages of the present invention will be apparent from the ensuing description and drawings in which.

Figure 1:
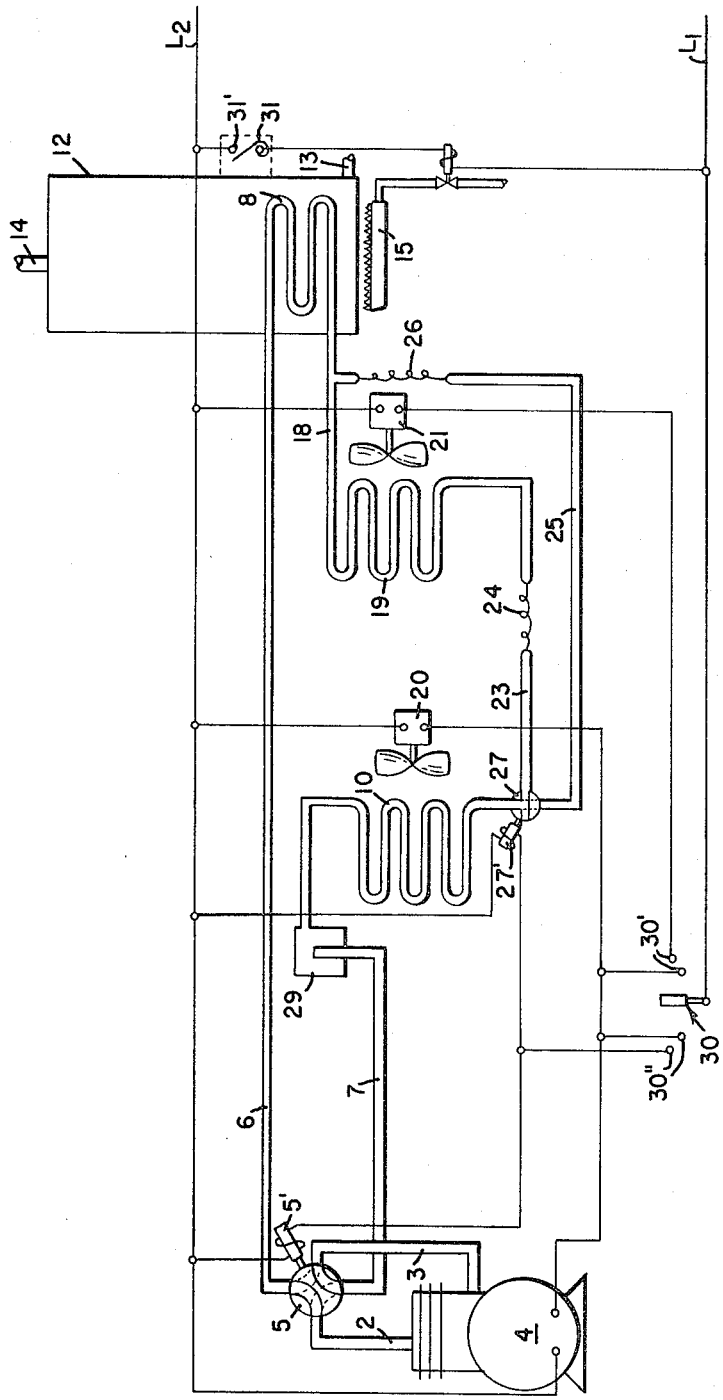
FIGURE 1 is a diagrammatic view showing a refrigeration system according to the present invention.

In FIGURE 1 of the drawings, refrigerant lines 2, 3 are connected to the discharge and suction sides of a suitable compression means such as reciprocating compressor 4 by reversing valve 5. Lines 6, 7 connect reversing valve 5 with water heating coil 8 and indoor heat exchanger coil 10 respectively. Coil 8 is disposed within a suitable water storage vessel 12 adjacent the bottom thereof. Conduit 13 communicates vessel 12 with a suitable source of water. Conduit 14 communicates vessel 12 with the place to be served. A sutiable water heater, for example, gas heater 15 is provided.

Refrigerant line 18 connects coil 8 with outdoor heat exchanger coil 19. Fan 20, when operated, brings air to be conditioned into heat exchange relation with coil 10, the conditioned air being thereafter directed into the area being conditioned. Fan 21, when operated, forces outdoor air across coil 19. Refrigerant line 23, incorporating suitable refrigerant expansion means such as capillary 24, connects coil 19 with coil 10 to complete the refrigeration circuit.

A refrigerant bypass line 25, incorporating a suitable refrigerant expansion means such as capillary 26, is connected between coils 8, 10 through three-way valve 27. Valve 27, which normally interrupts bypass line 25, is preferably provided with a solenoid operator 27'. Upon energization thereof, solenoid 27' moves valve 27 to close refrigerant line 23 and open bypass line 25 thereby permitting refrigerant from coil 10 to flow directly to coil 8. Refrigerant storage tank 29 is preferably provided in line 7.

With reversing valve 5 in the solid line position shown in FIGURE 1 of the drawings, on a demand for cooling, thermostat 30 closes contacts 30' to complete energizing circuits, from leads $L_1$, $L_2$, to compression means 4, outdoor fan 21 and indoor fan 20. Refrigerant from compression means 4 passes through line 2, reversing valve 5 and line 6 into coil 8 where the thermal transfer between the refrigerant in coil 8 and the water in vessel 12 heats the water while condensing the refrigerant. Refrigerant from coil 8 passes via line 18 to outdoor coil 19 where further condensation of the refrigerant is effected by the outdoor air stream.

Refrigerant from coil 19 passes through line 23, capillary 24 and valve 27 into indoor coil 10 where the thermal transfer between the air to be conditioned, brought into heat exchange relation with coil 10 by fan 20, cools the air while vaporizing the refrigerant. The cooled air is directed into the area to be conditioned. Refrigerant from coil 10 returns through line 7, valve 5 and line 3 to compression means 4.

When the temperature of the water in vessel 12 falls below the temperature setting of thermostat 31, thermostat 31 closes contact 31' to energize water heater 15.

On a demand for heat, thermostat 30 closes contacts 30" to complete energizing circuits to compression means 4, solenoids 5', 27' of valves 5, 27 respectively, and indoor fan 20. Solenoid 5' moves valve 5 to the dotted line position shown in FIGURE 1. Solenoid 27' moves valve 27 to the dotted line position to interrupt line 23 and open bypass line 25.

Refrigerant discharged from compression means 4 through line 2 is routed by valve 5 through line 7 into indoor coil 10 where the thermal interchange between air to be conditioned and refrigerant in coil 10 heats the air while condensing the refrigerant. The heated air is thereafter directed into the area being conditioned.

Refrigerant from coil 10 is directed by valve 27 through line 25 and capillary 26 into coil 8 where the thermal interchange effected between the water in vessel 12 and refrigerant in coil 8 vaporizes the refrigerant. Refrigerant returns from coil 8 through line 6, valve 5 and line 3 to compression means 4.

The withdrawal of heat from the water in vessel 12 by the refrigeration system during the heating operation reduces the temperature of the water in vessel 12. When the temperature of the water in vessel 12 reaches the predetermined response temperature of thermostat 31, thermostat 31 closes contact 31' to energize heater 15.

Refrigerant storage tank 29 tends to store a portion of the refrigerant during the cooling cycle. During the heating cycle operation, refrigerant in tank 29 vaporizes and the amount of stored refrigerant is reduced. During the heating operation, outdoor fan 21 is idle. Coil 19 tends to fill with liquid refrigerant. The excess refrigerant made available to the system by refrigerant storage tank 29 during heating operation accumulates in outdoor coil 19.

Figure 2:
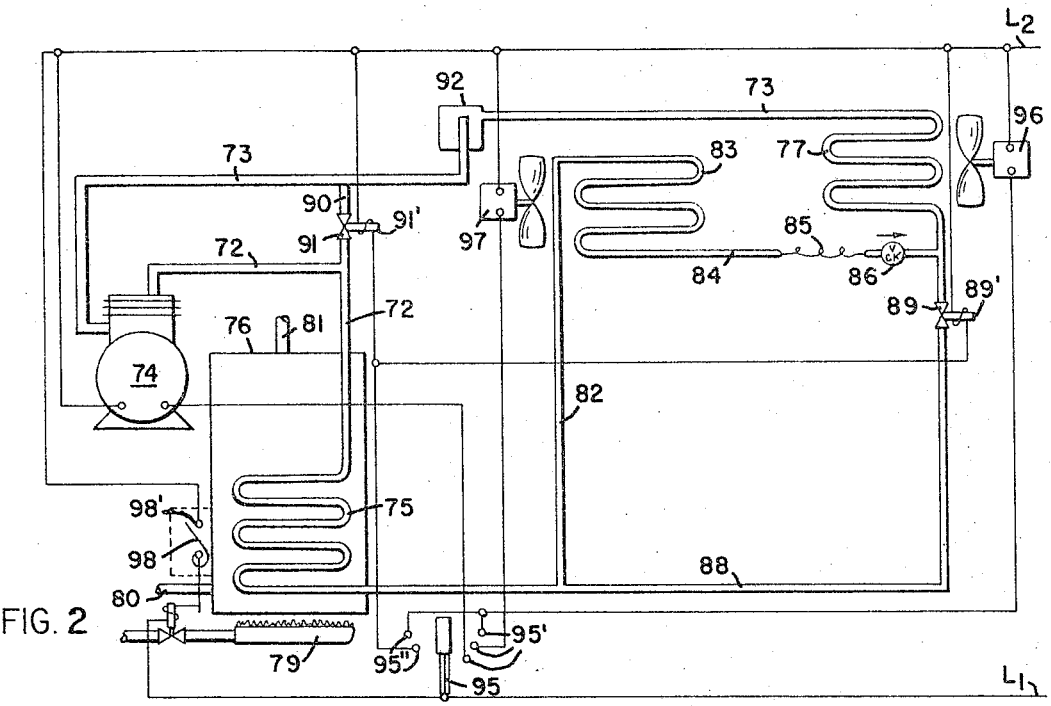
FIGURE 2 is a diagrammatic view showing a modified form of refrigeration system according to this invention.

Referring to FIGURE 2 of the drawings, refrigerant lines 72, 73 connect the discharge and suction sides of a suitable compression means 74 with water heating coil 75, disposed in water storage vessel 76, adjacent the bottom thereof, and with indoor heat exchanger coil 77 respectively. Coil 77 is physically disposed above coil 75. Vessel 76 includes suitable inlet and outlet conduits 80, 81 respectively, communicating vessel 76 with a source of water to be heated and with the place of use, respectively. A suitable water heating means, for example, gas heater 79, is provided.

Refrigerant line 82 connects coil 75 with outdoor heat exchanger coil 83. Indoor and outdoor coils 77, 83 are connected by line 84 having a suitable refrigerant expansion means, such as capillary 85, therein. Line 84 includes a suitable check valve 86 which prevents flow of refrigerant from indoor coil 77 into outdoor coil 83.

Refrigerant line 88 is connected between indoor coil 77 and coil 75. Energization of solenoid 89' of valve 89 opens line 88, bypassing capillary 85 and outdoor coil 83, and connecting indoor coil 77 directly with coil 75.

Refrigerant line 90 is connected between lines 72, 73. Valve 91, upon energization of solenoid 91' thereof, opens line 90. Refrigerant line 73 preferably includes a refrigerant storage tank 92.

Upon a demand for cooling, thermostat 95 closes contacts 95' to complete energizing circuits, from leads $L_1$, $L_2$, to compression means 74, indoor fan 96 and outdoor fan 97. Valves 89, 91 are closed.

Refrigerant discharged from compression means 74 through line 72 passes through coil 75, line 82, outdoor coil 83, capillary 85, check valve 86 and indoor coil 77, the refrigerant returning from coil 77 through line 73 to compression means 74. The passage of refrigerant through coil 75 heats the water in vessel 76. Air to be conditioned brought into heat exchange relation with indoor coil 77 by fan 96 is cooled. Refrigerant withdrawn from the system accumulates in refrigerant storage tank 92.

Upon a demand for heat, thermostat 95 closes contacts 95" to complete energizing circuits to indoor fan 96 and solenoids 89', 91' of valves 89, 91 respectively. Solenoid 91' opens valve 91 to bypass compression means 74. Solenoid 89' opens valve 89 to bypass outdoor coil 83 and capillary 85. Check valve 86 prevents flow of refrigerant from indoor coil 77 into capillary 85 and outdoor coil 83.

The thermal interchange between the water in vessel 76 and the refrigerant in coil 75 vaporizes the refrigerant in coil 75, which passes through line 72, bypass line 90 and line 73 to indoor coil 77 where the thermal transfer between air to be conditioned, brought into heat exchange relation with coil 77 by fan 96, heats the air while condensing refrigerant in coil 77. Liquid refrigerant from coil 77 returns through bypass line 88 to coil 75.

The physical placement of indoor coil 77 above coil 75 establishes a liquid head in bypass line 88 which maintains circulation of the refrigerant through coils 75, 77. Refrigerant in tank 92 vaporizes, the stored refrigerant passing into the system to replenish liquid refrigerant accumulating in outdoor coil 83, as explained heretofore in the discussion of the FIGURE 1 embodiment.

Thermostat 98 closes contact 98' to complete an energizing circuit to water heater 79 when the temperature of the water in vessel 76 reaches the response setting temperature of thermostat 98.

Figure 3:
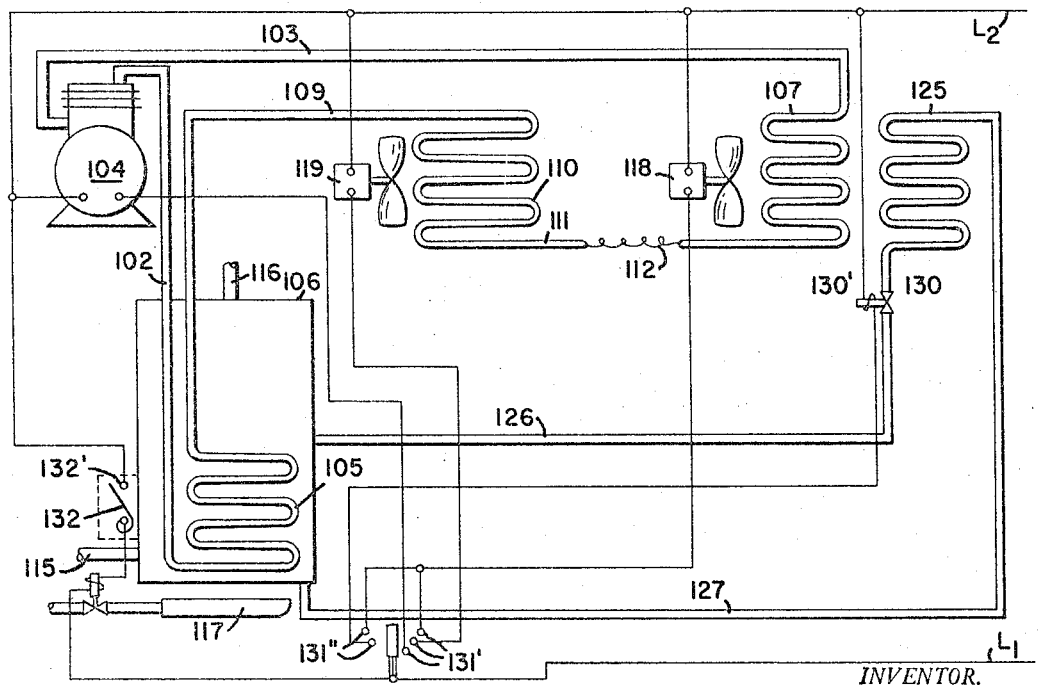
FIGURE 3 is a diagrammatic view showing another modified form of refrigeration system according to this invention.

Referring to FIGURE 3 of the drawings, refrigerant lines 102, 103 connect discharge and suction sides, respectively, of a suitable compression means 104 with water heating coil 105, positioned in water storage vessel 106 adjacent the bottom thereof, and indoor coil 107, respectively. Line 109 connects coil 105 with outdoor heat exchanger coil 110. Line 111, having a suitable refrigerant expansion means such as capillary 112, connects coils 107, 110.

Conduit 115 connects vessel 106 with a suitable source of water to be heated. Conduit 116 connects vessel 106 with the area to be served. Suitable water heating means, such as gas heater 117, is provided.

Indoor heat exchanger coil 107 is placed in operative relation with the area to be conditioned. Fans 118, 119, when operated, circulate air to be conditioned and outdoor air, respectively, across coils 107, 110, respectively.

A second indoor heat exchanger coil 125 is disposed in the conditioned air stream generated by fan 118. Lines 126, 127 connect coil 125 with vessel 106. Solenoid 130' of valve 130, when energized, opens valve 130 to permit the circulation of water from vessel 106 through coil 125. Coil 125 is physically placed above coil 105.

On a demand for cooling, thermostat 131 closes contacts 131' to complete energizing circuits, from leads $L_1$, $L_2$, to compression means 104, indoor fan 118 and outdoor fan 119. Refrigerant discharged from compression means 104 passes through line 102, coil 105, line 109, outdoor coil 110, capillary 112 and indoor coil 107, the refrigerant returning from coil 107 to compression means 104 by means of line 103. Refrigerant flowing through coil 105 heats the water in vessel 106. Refrigerant evaporated in coil 107 cools the conditioned air stream generated by fan 118.

On a demand for heat, thermostat 131 closes contacts 131" to complete energizing circuits to indoor fan 118 and solenoid 130'. Solenoid 130' opens valve 130 to permit hot water from vessel 106 to circulate through coil 125, the water returning to vessel 106 by means of line 127. The placement of coil 125 above coil 105 establishes the required liquid head to insure circulation of the water.

The relative height relationship between coils 125 and 105 may be dispensed with, where a suitable water circulating pump is provided. Operation of the water circulating pump may be made dependent upon energization of indoor fan 118.

Water temperature responsive thermostat 132 closes contact 132' to energize heater 117 when the temperature of the water in vessel 106 falls below the predetermined response temperature of thermostat 132.

Where desired, a second coil, positioned within water storage vessel 106, may be connected across lines 126, 127 to form, in cooperation with coil 125, a closed heating circuit. Where such a construction is utilized, the closed heating circuit is preferably charged with refrigerant.

The present invention realizes increased efficiency by utilizing heat normally dissipated into the atmosphere during cooling cycle operation of a refrigeration system to heat service hot water. Upon a demand for heat, the apparatus of the present invention employs an auxiliary heating means such as a gas heater acting through the intermediary of the store of service hot water as either a supplement for heat realized by the refrigeration system where that system is a reverse cycle system or as the entire source of heat in the case of a refrigeration system only.

While I have described preferred embodiments of the present invention, it is understood that this invention may be otherwise embodied within the scope of the following claims.

I claim:
1. In an apparatus for conditioning an area, the combination of a compressor having suction and discharge sides, expansion means, a first heat exchanger connecting said compressor discharge side with said expansion means, and a second heat exchanger in heat exchange relation with a first fluid medium connecting said expansion means with said compressor suction side to form a closed refrigeration system, said first fluid medium being usable to condition said area; a third heat exchanger disposed in heat exchange relation with a second fluid medium to be conditioned connected between said first exchanger and said compressor discharge side whereby upon operation of said compressor, said system cools said first medium while heating said second medium; supplemental first heating means for said second fluid medium; first control means responsive to temperature conditions of said second fluid medium effective at a predetermined second fluid medium temperature to actuate said supplemental heating means; second heating means effective when actuated to heat said first fluid medium from said second fluid medium; and second control means operative upon a demand for heat of the area being conditioned to actuate said second heating means.

2. Apparatus according to claim 1 in which said second heating means includes a reversing valve effective when actuated to connect said compressor discharge and suction sides with said second and third heat exchangers respectively; bypass means adapted when rendered operative to communicate said third heat exchanger directly with said second heat exchanger and bypass said expansion means and said first heat exchanger, said bypass means including a second expansion means; said second control means being operable on a demand for heat of said area to simultaneously actuate said reversing valve and said bypass means whereby upon operation of said compressor, said second and third heat exchangers function as condenser and evaporator respectively to heat said first fluid medium from said second fluid medium.

3. Apparatus according to claim 1 in which said second heating means includes a first bypass circuit between said second and third heat exchangers for bypassing said first heat exchanger and said expansion means; a second bypass circuit between said compressor discharge and suction sides for bypassing said compressor; said second control means being operable on demand for heat of said area to simultaneously actuate said first and second bypass circuits whereby said second and third heat exchangers function as condenser and evaporator respectively to heat said first fluid medium from said second fluid medium.

4. Apparatus according to claim 1 in which said second heat exchanger includes first and second heat exchanger coils, said first heat exchanger coil being connected between said expansion means and the compressor suction side in said system, said second heat exchanger coil comprising a portion of a heat exchange system independent of said refrigeration system adapted to heat said first fluid medium from said second fluid medium.

5. Apparatus according to claim 4 including means for circulating said second fluid medium through said second heat exchanger coil to heat said first fluid medium, valve means controlling the circulation of said second fluid medium through said second heat exchanger coil, said second control means regulating operation of said valve means in response to heating demands of the area being conditioned.

6. In a conditioning apparatus, the combination of: a compressor having discharge and suction sides; a first outdoor heat exchanger coil connected to said compressor discharge side; a second indoor heat exchanger coil connected to said compressor suction side, said indoor coil being disposed in heat exchange relation with a first medium to be conditioned; expansion means connecting said outdoor coil with said indoor coil whereby upon operation of said compressor said system cools said first medium; a third heat exchanger coil connected between said compressor discharge side and said outdoor coil, said third coil being arranged in heat exchange relation with a second medium to be conditioned whereby upon actuation of said compressor said second medium is heated; a bypass line adapted to connect said indoor coil with said third coil and bypass said outdoor coil and said expansion means; said bypass line including expansion means; first valve means effective when actuated to open said bypass line while interrupting communication of said indoor coil with said outdoor coil through said first expansion means; second valve means effective when actuated to connect said compressor discharge and suction sides with said indoor and third coils respectively; and control means for said first and second valve means responsive to a predetermined demand to actuate said first and second valve means whereby on operation of said compressor, said indoor coil functions as a condenser while said third coil functions as an evaporator to heat said first medium from said second medium.

7. In a conditioning apparatus, the combination of: a compressor having discharge and suction sides; a first outdoor heat exchanger coil connected to said compressor discharge side; a second indoor heat exchanger coil connected to said compressor suction side, said indoor coil being disposed in heat exchange relation with a first medium to be conditioned; expansion means connecting said outdoor coil with said indoor coil whereby upon operation of said compressor said system cools said first medium; a third heat exchanger coil connected between said compressor discharge side and said outdoor coil, said third coil being arranged in heat exchange relation with a second medium to be conditioned whereby upon actuation of said compressor said second medium is heated; means for withdrawing heat from said second medium to heat first medium, including a first bypass line adapted to connect said indoor coil with said third coil and bypass said outdoor coil, a valve for said first bypass line effective when actuated to open said first bypass line, a second bypass line adapted to interconnect said compressor suction and discharge sides thereby bypassing said compressor, and a valve for said second bypass line effective when actuated to open said second bypass line; and control means responsive to a predetermined demand to actuate said first and second bypass valves to directly connect said third coil with said indoor coil whereby said indoor coil functions as a condenser while said third coil functions as an evaporator to heat said first medium from said second medium.

8. Apparatus according to claim 7 in which said indoor coil is disposed above said third coil whereby condensed refrigerant from said indoor coil establishes a liquid head effective to circulate refrigerant through said indoor and third coils.

9. Apparatus according to claim 7 including fan means effective when actuated to bring said first medium into heat exchange relation with said indoor coil, said control means being adapted to actuate said fan means at said predetermined demand.

10. In a conditioning apparatus, the combination of, a compressor having discharge and suction sides; a first outdoor heat exchanger coil connected to said compressor discharge side; a second indoor heat exchanger coil connected to said compressor suction side, said indoor coil being disposed in heat exchange relation with a first medium to be conditioned; expansion means connecting said outdoor coil with said indoor coil whereby upon operation of said compressor said system cools said first medium; a third heat exchanger coil connected between said compressor discharge side and said first outdoor coil, said third coil being arranged in heat exchange relation with a second medium to be conditioned whereby upon actuation of said compressor said second medium is heated; means for withdrawing heat from said second medium to heat said first medium, including a fourth heat exchanger coil disposed in heat exchange relation with said first medium, conduit means connecting said fourth coil with said second medium, and valve means controlling circulation of said second medium through said conduit means to said fourth coil; and control means responding to a predetermined demand to actuate said valve means and permit circulation of second medium through said fourth coil.

References Cited by the Examiner

UNITED STATES PATENTS

| | | | |
|---|---|---|---|
| 2,102,940 | 12/1937 | Buchanan | 165—29 |
| 2,375,157 | 5/1945 | Wilkes et al. | 165—62 X |
| 2,575,325 | 11/1951 | Ambrose et al. | 165—29 X |
| 3,188,829 | 6/1965 | Siewart et al. | 62—324 X |

ROBERT A. O'LEARY, *Primary Examiner.*

M. A. ANTONAKAS, *Assistant Examiner.*